United States Patent [19]

Hasegawa et al.

[11] Patent Number: 4,558,682
[45] Date of Patent: Dec. 17, 1985

[54] AIR INTAKE SIDE SECONDARY AIR SUPPLY SYSTEM FOR AN INTERNAL COMBUSTION ENGINE

[75] Inventors: Shumpei Hasegawa, Niiza; Michitaka Shiraiwa, Kamifukuoka, both of Japan

[73] Assignee: Honda Giken Kogyo Kabushiki Kaisha, Tokyo, Japan

[21] Appl. No.: 587,743

[22] Filed: Mar. 8, 1984

[30] Foreign Application Priority Data

Mar. 17, 1983 [JP] Japan .................................. 58-045056
Mar. 19, 1983 [JP] Japan .................................. 58-046923
Mar. 19, 1983 [JP] Japan .................................. 58-046922

[51] Int. Cl.⁴ ............................................. F02M 23/04
[52] U.S. Cl. ..................................... 123/589; 123/587
[58] Field of Search ............... 123/339, 585, 586, 587, 123/589

[56] References Cited

U.S. PATENT DOCUMENTS

| 4,156,415 | 5/1979 | Zeller et al. | 123/589 X |
| 4,249,505 | 2/1981 | Nishimura | 123/585 X |
| 4,335,699 | 6/1982 | Totsune et al. | 123/585 X |

FOREIGN PATENT DOCUMENTS

| 0041411 | 4/1981 | Japan | 123/587 |
| 0135242 | 8/1982 | Japan | 123/339 |

Primary Examiner—Craig R. Feinberg
Assistant Examiner—W. R. Wolfe
Attorney, Agent, or Firm—Pollock, Vande Sande and Priddy

[57] ABSTRACT

An air intake side secondary air supply system for an internal combustion engine provided with an air/fuel ratio feedback control operation, comprises a pressure responsive air control valve which controls the communication through a secondary air supply passage, i.e., the amount of the air intake side secondary air supplied to the engine. A first control pressure for opening the air control valve and a second control pressure for closing the air control valve is alternately supplied to the air control valve in accordance with a detected state of the air/fuel ratio of the engine. The system is further provided with a device for respectively controlling the speed of the supply of the first and second control pressure, which in turn causes the variation of the speed of the air/fuel ratio control.

13 Claims, 16 Drawing Figures

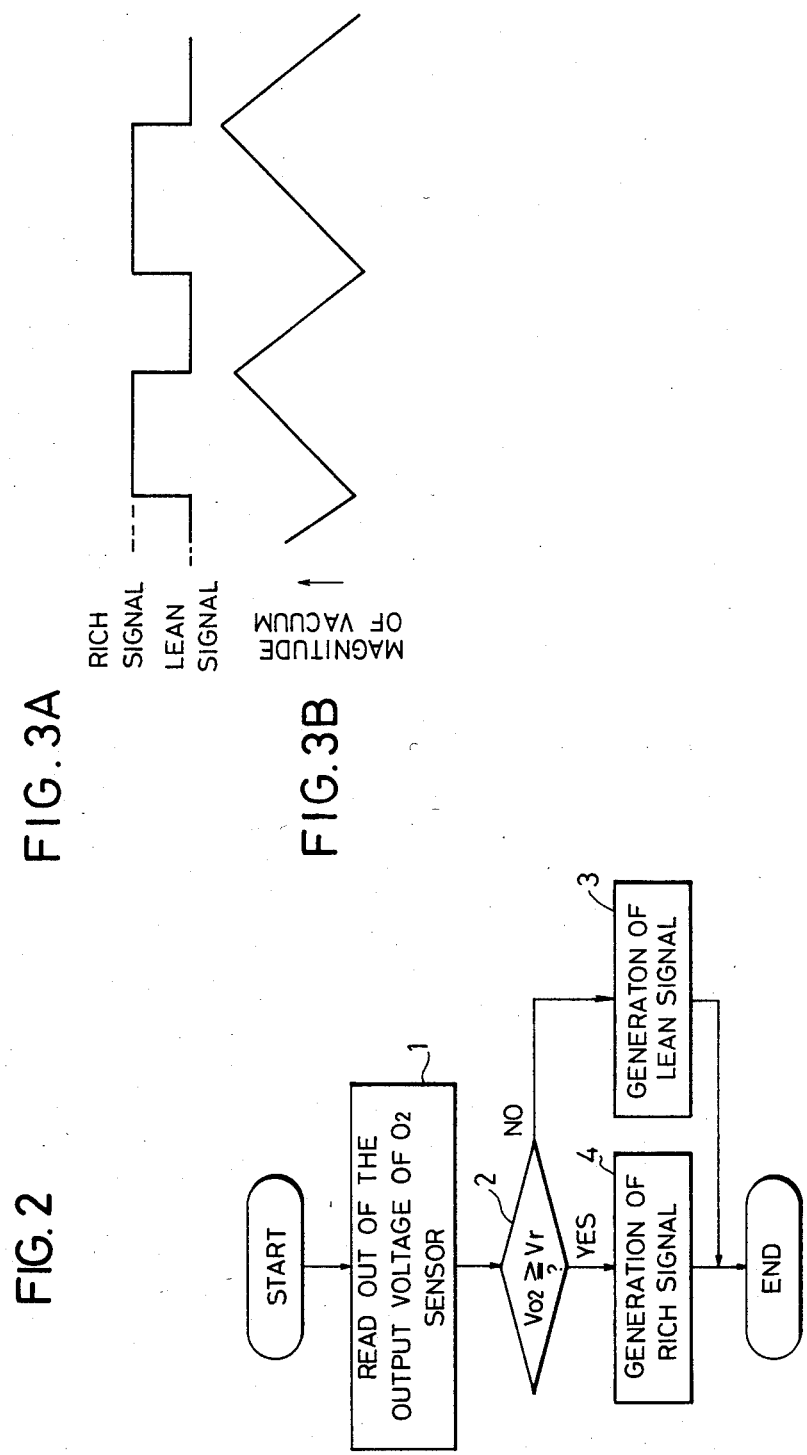

FIG.14

AIR INTAKE SIDE SECONDARY AIR SUPPLY SYSTEM FOR AN INTERNAL COMBUSTION ENGINE

BACKGROUND OF THE INVENTION

1. Field of the Invention

The present invention relates to an air intake side secondary air supply system for an internal combustion engine, for controlling the amount of the secondary air to be supplied to the engine.

2. Description of Background Information

In an internal combustion engine provided with a three-way catalytic converter in the exhaust system, it is general to control the air/fuel ratio of the engine around a stoichiometric value (14.7:1 for example) in accordance with the operational conditions of the engine in order to provide an optimum operation of the catalytic converter. The so called air intake side secondary air supply system is an example of the air/fuel ratio control system of this type. In the air intake side secondary air supply system, there is provided a secondary air passage leading to a portion of an intake air passage downstream of the throttle valve and the amount of the secondary air passing therethrough is varied to adjust the air/fuel ratio of the mixture to be supplied to the engine.

As an example of the air intake side secondary air supply system, the present applicant has proposed a system in which an air control valve is disposed in the secondary air supply passage, for varying the sectional area of the secondary air supply passage in accordance with the pressure level in a pressure chamber of the air control valve. Further, the actual air/fuel ratio is detected from an oxygen content of the exhaust gas, and a first control pressure is applied to the pressure chamber of the air control valve to gradually increase the sectional area of the secondary air supply passage when the detected air/fuel ratio is rich and a second control pressure is applied to the pressure chamber of the air control valve to gradually decrease the sectional area of the secondary air supply passage when the detected air/fuel ratio is lean.

Thus, in the above described air intake side secondary air supply system proposed by the applicant, the control speed of the enrichment or leaning control of the mixture is determined by the sectional area of the first control pressure passage or the second control pressure passage to the pressure chamber of the air control valve. However, in some states of the engine operation, it is suitable to change the speed of the air/fuel ratio control depending on whether the control is the control to the richer side or the control to the leaner side.

Accordingly, it is desirable to design the air/fuel ratio control system so that the speed of the control to the richer side and the speed of the control to the leaner side can be established independently from each other.

Further, in the case of an internal combustion engine equipped with the three way catalytic converter, the air/fuel ratio in which the efficiency of the catalyst becomes optimum, varies depending on the kind of the noxious component. Thus, it is also desirable that the central value of the air/fuel ratio control can be varied according to the state of the engine operation, so as to improve the efficiency of the emission control system.

SUMMARY OF THE INVENTION

An object of the present invention is to provide an air intake side secondary air supply system of the type of pneumatic integration control, in which the speed of the air/fuel ratio control can be determined arbitrarily and independently in both directions to the lean side and the rich side.

Another object of the present invention is to provide an air intake side secondary air supply system of the type of pneumatic integration control, in which the central value of the air/fuel ratio control is varied in accordace with the state of the engine operation, so as to improve the efficiency of the emission control.

According to the present invention, the secondary air supply system is constructed in such manner that the pressure chamber of the air control valve is supplied with a first control pressure via a first pressure passage, and a second control pressure via a second pressure passage, and the first and the second pressure passages are respectively provided with an orifice which determines the speed of the air/fuel ratio control.

According to another aspect of the invention, the first control pressure is applied to the pressure chamber of the air control valve via the first pressure passage, and the total sectional area of the first pressure passage is varied in accordance with the condition of the engine operation.

According to further aspect of the invention, the second control pressure is applied to the pressure chamber of the air control valve via the second pressure passage, and the total sectional area of the second pressure passage is varied in acordance with the state of the operation of the engine.

Further scope and applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the following description taken in conjunction with the accompanying drawings which are given by way of illustration only, and thus are not limitative of the present invention, and wherein:

FIG. 2 is a flowchart showing an operation of the control circuit of the system of FIG. 1;

FIGS. 3A and 3B are diagrams showing the variation of vacuum in the pressure chamber of the air control valve disposed in the system of FIG. 1;

FIG. 14 is a schematic diagram showing a variation of the third embodiment shown in FIG. 12, in which the electro-magnetic valve 55 is replaced by a vacuum control valve 58.

DETAILED DESCRIPTION OF PREFERRED EMBODIMENTS

Figure 1:
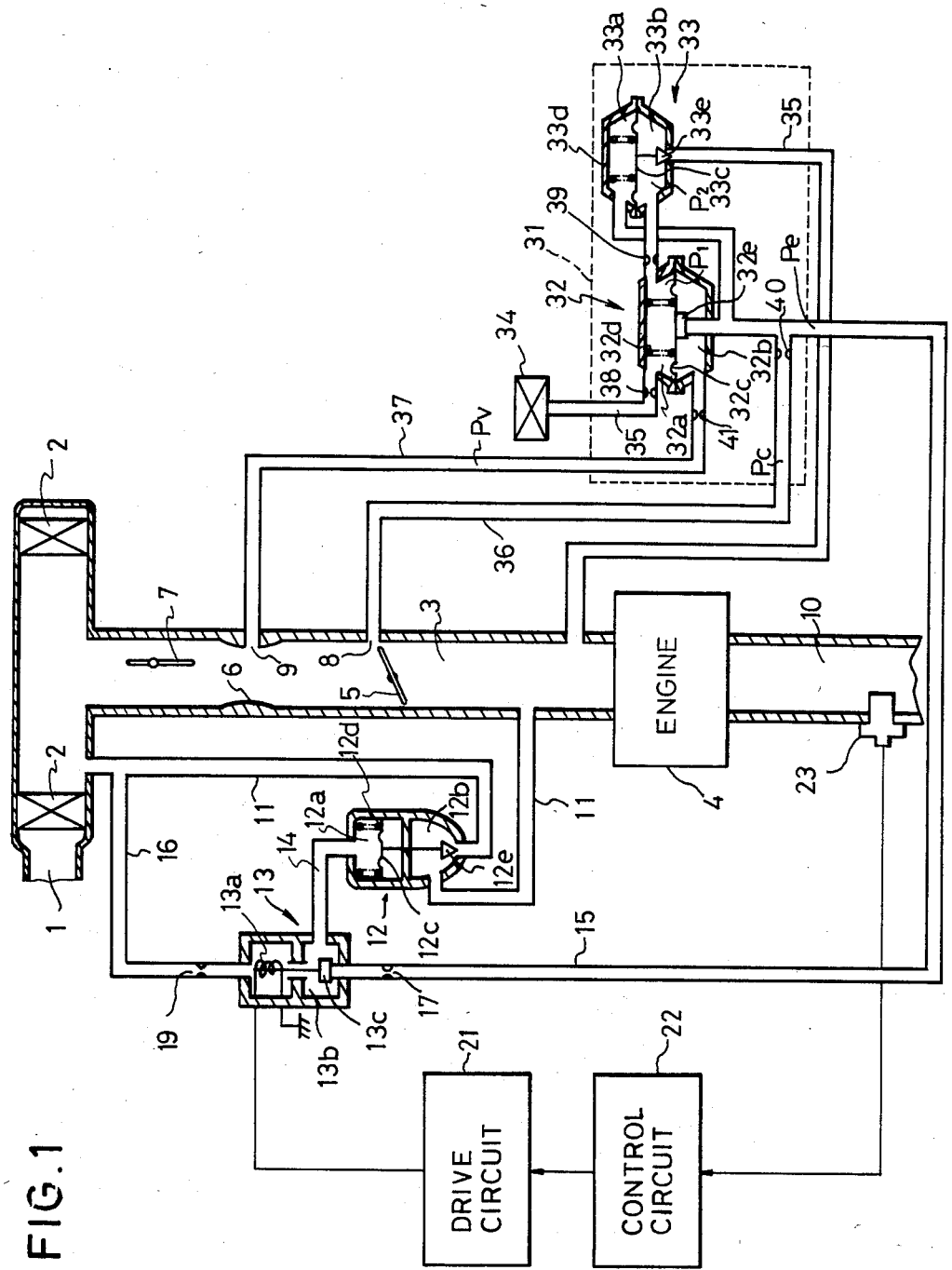
FIG. 1 is a schematic diagram of a first embodiment of the air intake side secondary air supply system according to the present invention.

An embodiment of the present invention will be explained with reference to the schematic diagram of FIG. 1 hereinafter.

As shown, intake air taken from an air inlet port 1 is supplied to an internal combustion engine 4 via an air cleaner 2 and intake air passage 3. In the intake air passage 3, a throttle valve 5 is provided in the middle. Further, a venturi 6 is formed upstream from the throttle valve 5 and a choke valve 7 is disposed upstream of the venturi 6. In the wall surface of the intake air passage 3, in proximity to the position of the throttle valve 5, a vacuum detection hole 8 is provided in such a manner that the vacuum detection hole 8 is located upstream from the throttle valve 5 when the throttle valve 5 is closed, and located downstream from the throttle valve 5 when the throttle valve 5 is opened. A second vacuum detection hole 9 is also provided to the venturi 6. A portion of the air intake system downstream of the throttle valve 5, i.e., the intake manifold is communicated with a portion around an air outlet port of the air cleaner 2 via an air intake side secondary air passage 11. In the secondary air passage 11, there is provided an air control valve 12 which consists of a vacuum chamber 12a, a valve chamber 12b acting as a part of the secondary air passage 11, a diaphragm 12c defining a wall of the vacuum chamber 12a, and a needle type valve element 12e placed in the valve chamber 12b and applied with a biasing force of a valve spring 12d via the diaphragm 12c to close the secondary air passage 11. With this construction, the cross sectional area of the secondary air passage 11 is increased as the magnitude of the vacuum acting upon the vacuum chamber 12a increases.

To the vacuum chamber 12a of the air control valve 12, there is applied a vacuum pressure from a three-way electro-magnetic valve 13 via a pressure passage 14. The electro-magnetic valve 13 includes a solenoid 13a, a valve chamber 13b communicated with the vacuum chamber 12a via the pressure passage 14, and a valve element 13c which is mounted in the valve chamber 13b and magnetically coupled with the solenoid 13a. The valve chamber 13b is communicated with a vacuum control part 31 which produces a first control pressure via a vacuum passage 15 for introducing the first control pressure, and also communicated with the part of the secondary air passage 11 upstream from the air control valve 12 via an atmospheric pressure passage 16 for introducing a second control pressure. When the solenoid 13a is not energized, the side of the vacuum passage 15 is closed, and at the same time the pressure passage 14 and the atmospheric pressure passage 16 are communicated with each other via the valve chamber 13b. On the other hand, when the solenoid 13a is energized, the side of the atmospheric pressure passage 16 is closed, and at the same time the pressure passage 14 and the vacuum passage 15 are communicated with each other.

The vacuum control part 31 consists of a vacuum responsive regulator valve 32 and an air valve 33 which consist of a vacuum chamber 32a or 33a, a diaphragm 32c or 33c, a valve spring 32d or 33d, and a valve element 32e or 33e respectively. The vacuum chamber 32a is disposed in the middle of a control air passage 35 which leads from an atmospheric air inlet port 34 with a filter to a part of the intake air passage downstream of the throttle valve 5, and the valve chamber 33b is disposed in the control air passage 35 downstream of the vacuum chamber 32a. The valve element 33e is applied with a resilient force of the valve spring 33d via the diaphragm 33c so as to close the control air passage 35. The vacuum chamber 33a is communicated with the vacuum detection hole 8 via a vacuum passage 36, and similarly, the valve chamber 32b is communicated with the vacuum detection hole 9 via a vacuum passage 37. The valve chamber 32b is communicated with the vacuum passage 36 and the valve element 32e is applied with a resilient force of the valve spring 32d via the diaphragm 32c so that the communication between the valve chamber 32b and the vacuum passage 36 is closed by the valve element 32e. In addition, in the control air passage 35, a pair of orifices 38 and 39 are provided respectively upstream and downstream of the vacuum chamber 32a. Further, orifices 40 and 41 are provided in the vacuum passage 36 and the vacuum passage 37 respectively.

A part of the vacuum passage 36 of the side of the valve chamber 32b and the vacuum chamber 33a from the orifice 40, is communicated with the vacuum passage 15.

The vacuum passage 15 is provided with an orifice 17, and the atmospheric pressure passage 16 is provided with an orifice 19.

The solenoid 13a is connected, via a drive circuit 21, to a control circuit 22. The control circuit 22 is connected with an oxygen sensor 23 which is disposed in an exhaust pipe 10 of the engine 4 and produces a voltage signal whose level is indicative of the oxygen contents in the exhaust gas of the engine.

The operation of the thus constructed fluid supply amount feedback control system according to the present invention will be explained hereinafter.

The operation of the vacuum control part 31 is as follows. When a vacuum Pc from the vacuum detection hole 8 is applied to the vacuum chamber 33a via the vacuum passage 36 in accordance with the operation of the engine 4, the valve element 33e is displaced in a direction to open the valve 33 if the vacuum pressure Pc is greater than the resilient force of the valve spring 33d. By the opening of the air valve 33, outside air from the atmospheric air inlet port 34 is introduced to the intake air passage 3 downstream of the throttle valve 5, via the control air passage 35. The vacuum P1 and the vacuum P2 respectively in the vacuum chamber 32a and the valve chamber 33b through which the outside air travels, is determined in accordance with the aperture ratio of the orifices 38 and 39 respectively.

In this condition, if the differential pressure between the vacuum Pv from the vacuum detection hole 9, acting in the valve chamber 32b and the vacuum P1 is greater than the resilient force of the valve spring 32d, the valve element 32e is displaced in the direction to open the valve 32. By this opening of the control valve 32, a part of the vacuum Pv is directed to dilute the vacuum past the orifice 40 to produce a vacuum Pe acting in the vacuum chamber 12a when the electro-magnetic valve 13 is activated.

Subsequently, due to the drop of the vacuum Pe, the opening degree of the air valve 33 is decreased to reduce the amount of the air flowing through the control air passage 35. By this reduction in the air flow amount, the vacuum P1 in the vacuum chamber 32a is reduced to close the control valve 32. Then the vacuum Pe is raised once more and the above sequential operations will be repeated. It is to be noted that the ratio between the vacuum Pv and the vacuum Pe becomes equal to the ratio between the vacuum P1 and the vacuum P2, since the speed of these repeating operations is very fast.

Therefore, when the amount of the main intake air of the engine 4 is relatively small where the vacuum P1 is greater than Pv, the opening degree of the regulation valve 32 becomes large and the vacuum Pe becomes low. On the other hand, as the amount of the main intake air increases, the opening degree of the regulation valve 32 becomes smaller since the vacuum Pv increases, and consequently the vacuum Pe becomes high. Since the vacuum Pe acts in the vacuum chamber 12a as well as in the vacuum chamber 33a to open the air valve 33 and air control valve 12 during the actuation of the electro-magnetic valve 13, the amount of the air flowing through the control air passage 35 for opening the air control valve 12 becomes proportional to the amount of the secondary air which flows through the air control passage 11 when the electro-magnetic valve 13 is activated. Similarly, the amount of the main intake air supplied to the engine 4 via the intake air passage 3 becomes proportional to the amount of the secondary air flowing through the secondary air passage 11 by the opening of the air control valve 12. As a result, the vacuum Pe has a value proportional to the amount of the main intake air to the engine and forms the first control pressure to be introduced into the vacuum chamber 12a.

The operation of the control circuit 22 will be then explained with reference to the flowchart of FIG. 2.

When an ignition switch (not shown) is turned on and a power current is supplied to the control circuit 22, firstly the output voltage of the oxygen sensor 23 is read out by the control circuit 22, at a step 1. Since the oxygen sensor 23 is of the so-called flow-out type, the output voltage $VO_2$ thereof increases as the ambient condition becomes rich. After reading out of the output voltage $VO_2$, the air/fuel ratio of the mixture is determined at a step 2, from this output voltage $VO_2$.

In this determination step, whether the air/fuel ratio is rich or lean is determined by comparing the output voltage $VO_2$ of the oxygen sensor 23 with a reference voltage Vr which corresponds to a stoichiometric air/fuel ratio. If $VO_2 < Vr$, the air/fuel ratio is determined to be lean, and a lean signal is applied to the drive circuit 21 to shift the air/fuel ratio to the rich side, at a step 3. On the other hand, if $VO_2 \geq Vr$, the air/fuel ratio is determined to be rich, and a rich signal is applied to the drive circuit 21 to shift the air/fuel ratio to the lean side, at a step 4.

Thus, when the lean signal or the rich signal is applied to the drive circuit 21 from the control circuit 22, the drive circuit makes the electro-magnetic valve 13 inactivated by failing to supply the drive current of the solenoid 13a in accordance with the lean signal or makes the same activated by supplying the drive current of the solenoid 13a in accordance with the rich signal.

Assuming that the output signal of the control circuit 22 turns from the lean signal to the rich signal, the electro-magnetic valve 13 is then activated to close the side of the atmospheric pressure passage 16 and at the same time make communication between the pressure passage 14 and the vacuum passage 15. As a result, the vacuum in the vacuum chamber 12a gradually approaches to the vacuum Pe because the vacuum Pe is supplied from the vacuum control part 31 to the vacuum chamber 12a via the orifice 17, and consequently the opening degree of the air control valve 12, i.e., the sectional area of the secondary air passage 11 gradually increases to increase the supply amount of the secondary air. When the vacuum in the vacuum chamber 12a has reached to a value equal to the vacuum Pe, the amount of the secondary air flowing through the secondary air passage 11 becomes proportional to the amount of the main intake air, thus the engine 4 is supplied with the secondary air whose amount is proportional to the main intake air amount.

Nextly, assuming that the output signal from the control circuit 22 turns from the rich signal to the lean signal, the electro-magnetic valve 13a is then inactivated and the side of the vacuum passage 15 is closed and at the same time, the pressure passage 14 is communicated with the atmospheric pressure passage 16. As a result, the vacuum in the vacuum chamber 12a gradually approaches the atmospheric pressure value because atmospheric pressure is supplied to the vacuum chamber 12a via the orifice 19, to gradually reduce the sectional area of the secondary air passage 11 and also reduce the amount of the secondary air. When the pressure in the vacuum chamber has become equal to the atmospheric pressure, the air control valve 12 closes to block the secondary air passage 11, and the supply of the secondary air to the engine 4 is stopped.

Accordingly, when the air/fuel ratio is to be controlled to the stoichiometric value, the rich signal and the lean signal are produced alternately as illustrated in FIG. 3A, and the vacuum in the vacuum chamber 12a varies as illustrated in FIG. 3B.

Now, the speed of the opening of the air control valve 12 can be expressed as follows:

$$Lo \propto S_1(Pe-Pav)^{\frac{1}{2}} \quad (1)$$

where Pav is the vacuum level in the vacuum chamber 12a, $S_1$ is the sectional area of the orifice 17, and Lo is the speed of the opening of the air control valve 12.

Thus, speed of the air/fuel ratio control directed to the lean side is dependent on the magnitude of the vacuum Pe, i.e., the amount of the intake air and the sectional area $S_1$ of the orifice 17.

Similarly, the speed of closing of the air control valve 12 can be expressed as follows:

$$Lc \propto S_2 \cdot Pav^{\frac{1}{2}} \quad (2)$$

where Lc is the speed of closing of the air control valve 12.

Thus, the speed of the air/fuel ratio control directed to the rich side is dependent on the sectional area $S_2$ of the orifice 19.

Accordingly, under an operational condition of the engine in which the amount of the intake air is constant, the speed Lo of opening of the air control valve 12, that is, the speed of the air/fuel ratio control directed to the lean side is proportional to the magnitude of the sectional area $S_1$ of the orifice 17. In addition, by selecting the sectional areas $S_1$ and $S_2$ at respectively selected values, the speed of the opening of the valve becomes proportional to the amount of the intake air. Therefore, the speed of the air/fuel ratio control directed to the lean side increases as the amount of the intake air increases. At the same time, the speed of the closure of the valve becomes constant.

Figure 4:
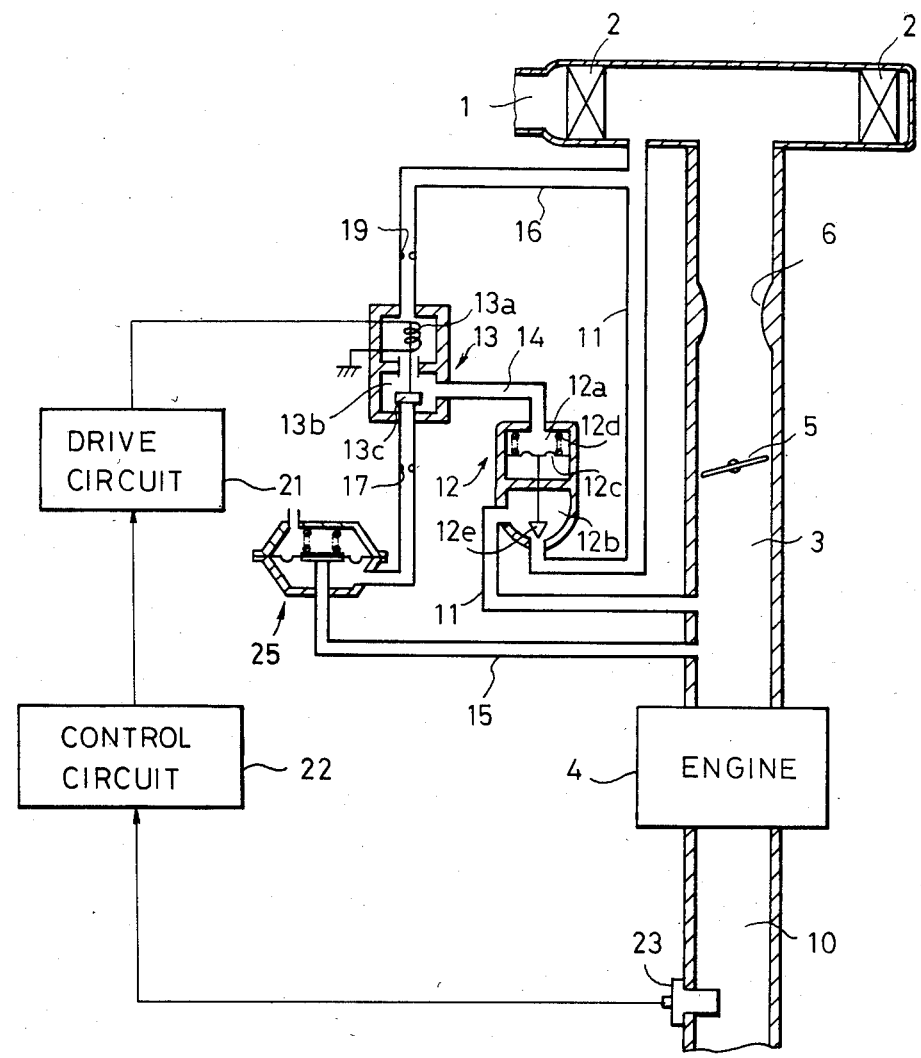
FIG. 4 is a schematic diagram showing a variation of the first embodiment shown in FIG. 1, in which the vacuum control part 31 is replaced by a constant vacuum control valve 25.

FIG. 4 shows a variation of the above embodiment in which the vacuum passage 15 is communicated with the downstream side of the throttle valve 5 and a part of the vacuum passage 15 on the downstream side of the throttle valve from the orifice 17 is provided with a constant vacuum control valve 25 which operates as a source of the first control pressure instead of the vacuum control part 31 of FIG. 1. The constant vacuum control valve 25 is designed to stabilize the vacuum downstream of the throttle valve to the vacuum Pr of the predetermined magnitude, when the magnitude of the former vacuum is greater than the latter. The other parts of the construction of this system is identical with the feedback control system of FIG. 1.

It will be understood from the foregoing, the air intake side secondary air supply system is characterized by the pneumatic type integration operation of the air/fuel ratio control, i.e., the secondary air supply amount control is effected by the application of the first control pressure to the pressure chamber of the air control valve via the first pressure passage, and the application of the second control pressure to the pressure chamber via the second pressure passage. Therefore, the speed of the integration operation varies with the diameter of the orifices provided in the pressure passage. Thus, the speed of the air/fuel ratio control in the direction of rich side or the direction of lean side, can be arbitrarily controlled by using the simple and low cost device.

Figure 5:
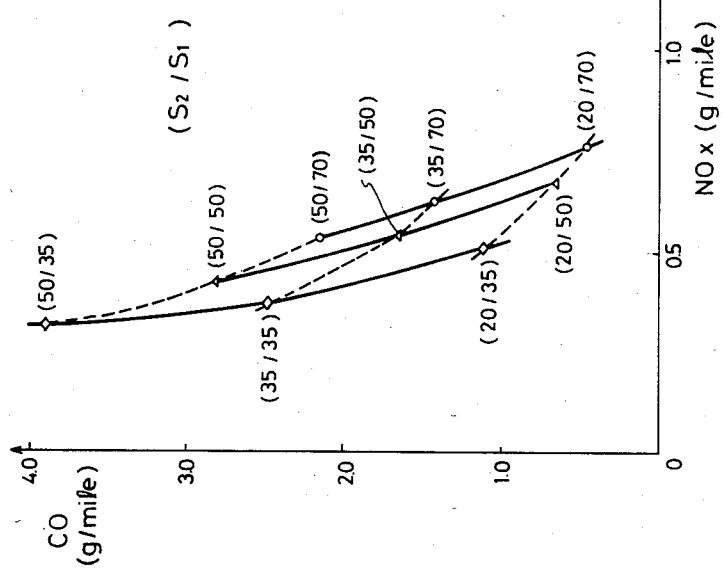
FIG. 5 is a graph showing the relation between the amount of the noxious components under various values of the sectional area of the first and second pressure passages.

Further, the amount of the noxious component contained in the exhaust gas of the engine can be controlled by simply establishing an interrelation of diameters of the orifices provided in the first and second pressure passages. In FIG. 5, there is illustrated the relation between the generation of CO (carbon monoxide) and the generation of NOx (oxides of nitrogen) under various values of the sectional area of the first and second pressure passages. As shown in the figure, the amounts of CO and NOx reduce as the sectional areas of the pressure passages reduce. However, if the sectional area $S_1$ of the first pressure passage is maintained constant, the amount of CO increases as the sectional area $S_2$ of the second pressure passage increases, while the amount of NOx decreases. On the other hand, when the sectional area $S_2$ is maintained constant, the amount of NOx increases as the sectional area $S_1$ increases, while the amount of CO decreases. With this relationship of the generation of the noxious components and the sectional area of the orifices, it becomes possible to provide a sufficient emission control in both cases in which the catalytic converter is of a type for the oxidation of CO and HC (hydrocarbon) and of a type for the deoxidation of NOx, by simply establishing the suitable ratio between the sectional areas $S_1$ and $S_2$.

Further, also in the case of an internal combustion engine equipped with the three-way catalytic converter, the speed of the air-fuel ratio control in the direction of rich side or in the direction of lean side can be arbitrarily controlled by the establishment of the sectional area of the orifices. Thus, the emphasis can be suitably placed either on the oxidation of CO and HC, or on the deoxidation of NOx.

In addition, in the case of the air intake side secondary air supply system of the present invention, the air/fuel ratio is controlled to the stoichiometric value on the side of the air induction system, there is not any need of shifting the air/fuel ratio to the rich side from the stoichiometric value, such control is the case in the conventional air/fuel ratio control system in which the secondary air is supplied in the exhaust system, and at upstream of the catalytic converter. Thus, an improvement of the fuel economy has been attained as compared with the conventional secondary air supply system.

Further, in the case of the secondary air supply system of the present invention, a rapid compensation of the air/fuel ratio during a period in which the amount of the intake air increases, such as the acceleration of the engine, is enabled. It is especially true in the case of the above embodiment in which the speed of the opening of the air control valve, i.e., the speed of the air/fuel ratio control of the lean side direction, is dependent upon the amount of the intake air.

Figure 6:
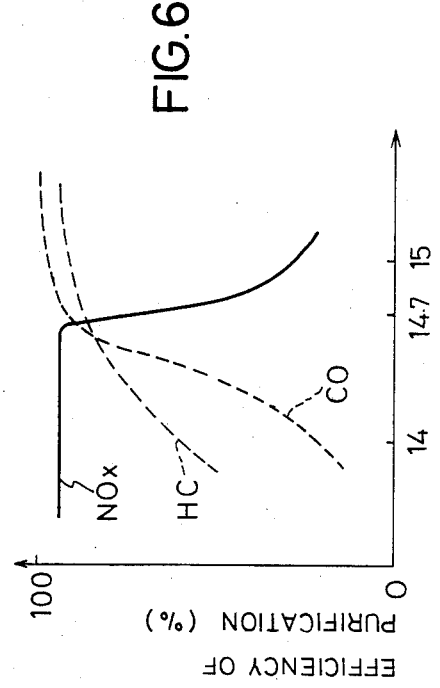
FIG. 6 is a graph showing curves indicating the efficiency of purification of the noxious components in the case of a three-way catalytic converter.

Turning to FIG. 6, the drawbacks of the conventional system for an internal combustion engine equipped with the three-way catalytic converter, will be further explained hereafter.

Figure 7:
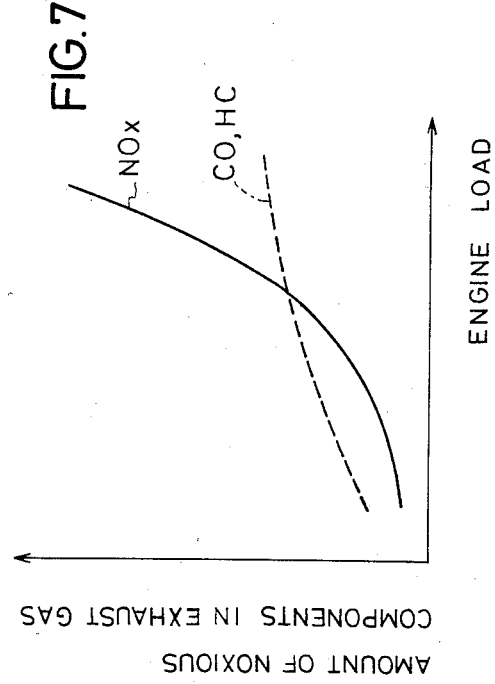
FIG. 7 is a graph showing a relationship between the amount of the noxious components and the engine load.

As shown, the efficiency of the catalyst becomes optimum on the rich side of the stoichiometric value, for the component of NOx, and on the lean side of stoichiometric value, for the components of CO and HC. Generally, during the idling or the low speed or low load operation of the engine, such as the deceleration of the engine, the amount of the intake air is reduced by the operation of the throttle valve while the amount of the fuel increases to shift the air/fuel ratio to the rich side, and to reduce the compression ratio in the engine cylinders. As a result, the combustion temperature becomes low and the amount of the CO component increases due to the incomplete combustion and the amount of the HC component also increases due to the generation of a quenching zone. On the other hand, during the high load operation of the engine, the speed of the combustion becomes high, resulting in the rise of the compression pressure and the combustion temperature, to increase the combustion efficiency. Therefore, in such a state of the engine operation, the amount of the NOx component goes high, although the amount of the HC and CO components remains relatively low, as indicated by the curves of FIG. 7.

Accordingly, in order to improve the efficiency of the emission control, it is desirable to automatically shift the target value of the air/fuel ratio control to the rich side or lean side depending on the engine operation also in the case of the internal combustion engine equipped with the air intake side secondary air supply system of the pneumatic type integration operation.

The embodiments of the present invention of this type will be explained with reference to FIG. 8 through FIG. 15.

Figure 8:
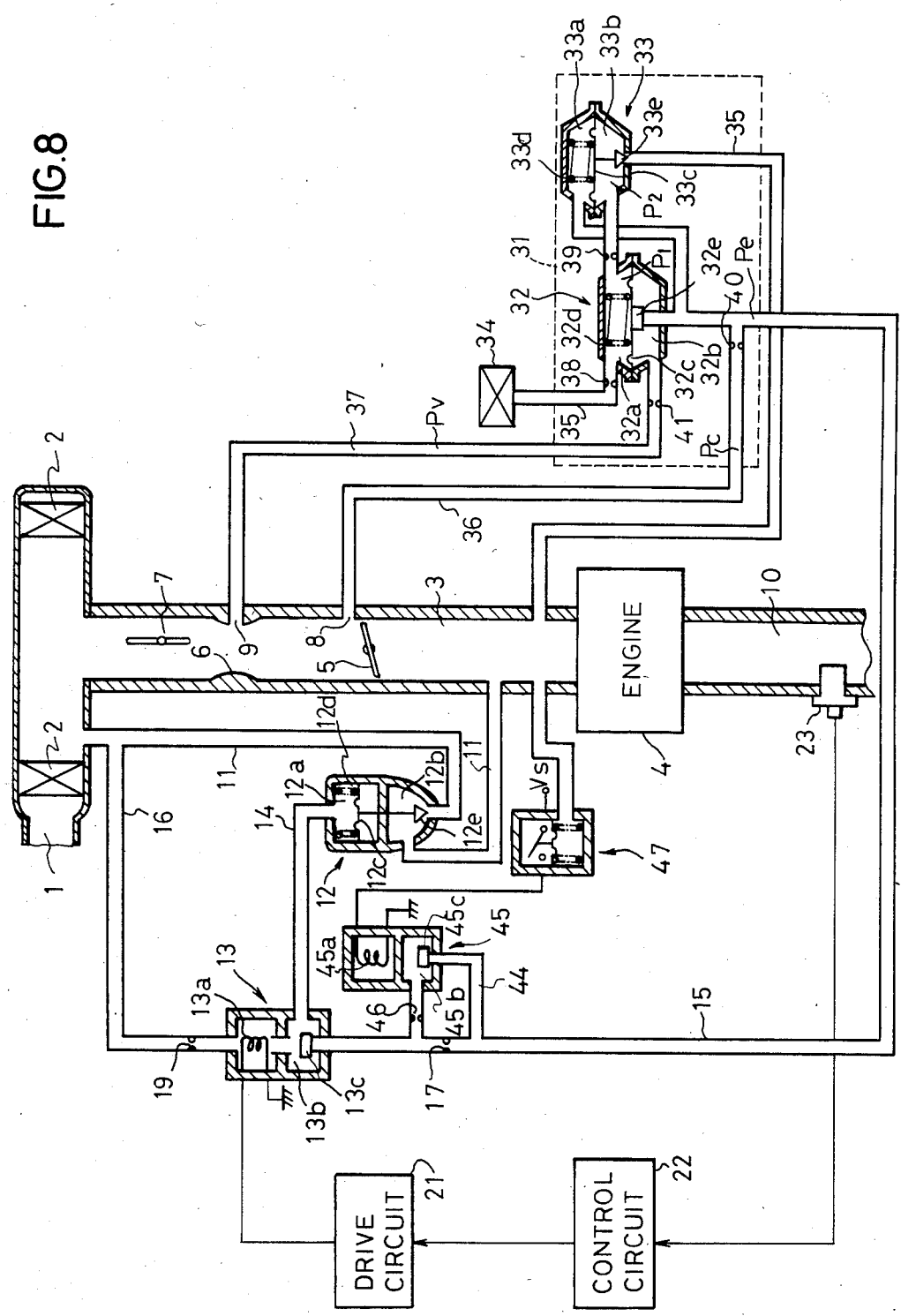
FIG. 8 is a schematic diagram of a second embodiment of the air intake side secondary air supply system, provided with a device for varying the sectional area of the first pressure passage leading to the pressure chamber of the air control valve.

Reference is first made to FIG. 8, showing the second embodiment of the invention which has the construction basically the same as that of the first embodiment illustrated in FIG. 1.

As shown, in addition to the construction of FIG. 1, a vacuum passage 44 is provided so as to bypass the orifice 17. In the vacuum passage 44 there are further provided an electro-magnetic valve 45 and an orifice 46. The electro-magnetic valve 45 consists of a solenoid 45a, a valve chamber 45b which forms a part of the vacuum passage 44, and a valve element 45c disposed in the valve chamber 45b and magnetically coupled with the solenoid 45a. The operation of the electro-magnetic valve 45 is such that the commmunication through the vacuum passage 44 is established when the solenoid 45a is energized. For energizing the solenoid 45a, a drive voltage Vs is supplied via a vacuum switch 47 which is connected to the intake air passage 3 and turns on when the vacuum of the downstream of the throttle valve 5 is greater than a predetermined level.

The operation of the secondary air supply system of this embodiment especially relating to the operation of the electro-magnetic valve 45 will be explained hereafter.

When the output signal of the control circuit 22 turns from the lean signal to the rich signal, the electro-magnetic valve 13 is activated to close the side of the atmospheric pressure passage 16, and to make the communication through the pressure passage 14 and the vacuum passage 15. By this operation, the vacuum chamber 12a is supplied with the vacuum Pe from the vacuum control part 31 through the orifice 17, and the vacuum in the vacuum chamber gradually approaches the vacuum Pe. Thus, the amount of the secondary air gradually increases as the gradual increase of the opening degree of the air control valve 12, i.e., the sectional area of the air intake side secondary air passage 11. In this state, if the vacuum downstream of the throttle valve 5 is greater than the predetermined value, then the vacuum switch 47 turns on to provide the voltage Vs to the solenoid 45a. As a result, the electro-magnetic valve 45 opens to make the communication through the vacuum passage 44. Thus, the vacuum Pe is applied to the vacuum chamber 12a through the orifice 17, and the orifice 46 in addition thereto. This means an increase in the total value of the sectional area of the vacuum passage leading to the vacuum chamber 12a. Therefore, the speed of the rising of the vacuum in the vacuum chamber 12a, i.e., the speed of the opening of the air control valve is increased.

When the vacuum in the vacuum chamber 12a has reached the value Pe, the amount of the secondary air passing through the air intake side secondary air passage becomes proportional to the amount of the main intake air. Thus, the engine is supplied with the secondary air whose amount is proportional to the amount of the main intake air.

It will be appreciated that in the case of this embodiment, the electro-megnetic valve 45 is opened during the light load operation of the engine in which the vacuum downstream of the throttle valve 5 is above the predetermined value. As a result, the total value of the sectional area of the vacuum passage leading to the vacuum chamber 12a is increased.

Figure 9:
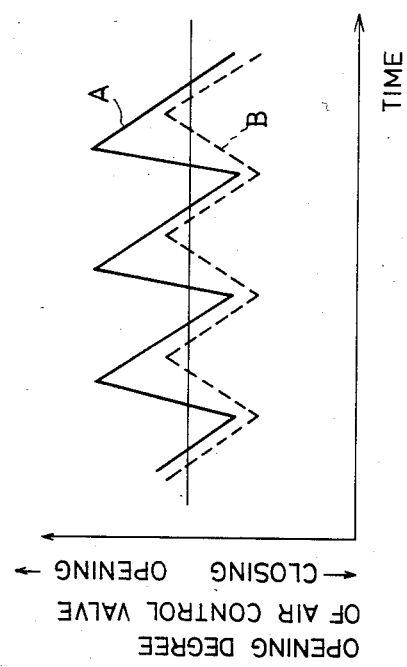
FIG. 9 is a diagram showing the operation of the air control valve of FIG. 8, during the light load operation of the engine and during the medium and high load operation of the engine.

This means an increase of the value $S_1$ of the formula (1), resulting in an increase in the speed of the opening of the air control valve 12, that is, the increase in the speed of the air/fuel ratio control directed to the lean side during light load operations of the engine. The operation of the secondary air supply system under such a condition is best shown by the solid line A of FIG. 9. In FIG. 9, there is also illustrated a dashed line B indicating the operation of the air control valve 12, i.e., the operation of the air/fuel ratio control system under the medium and high load operation of the engine. Accordingly, it will be appreciated if the target value of the air/fuel ratio control for the medium and high load engine operations is established at the stoichiometric value or slightly rich side of the stoichiometric value, then the air/fuel ratio is controlled to the lean side of the stoichiometric value during the light load operation of the engine.

Figure 10:
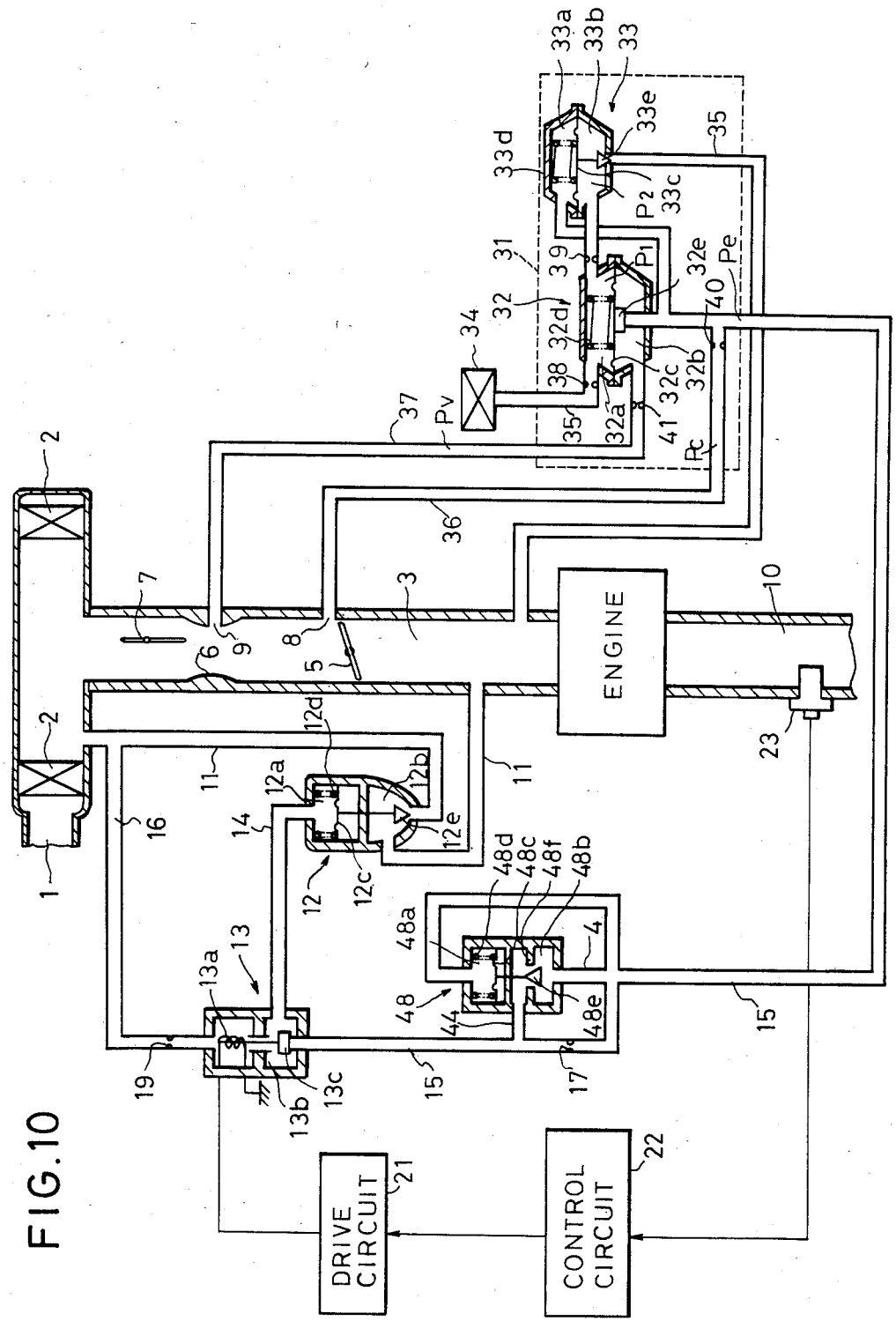
FIG. 10 is a schematic diagram showing a variation of the second embodiment shown in FIG. 8, in which the electro-magnetic valve 45 is replaced by a vacuum control valve 48.

FIG. 10 shows a variation of the embodiment shown in FIG. 8, which is characterized by a vacuum contol valve 48 provided in the vacuum passage 44 instead of the electro-magnetic valve 45. The vacuum control valve 48 is made up of a vacuum chamber 48a, a valve chamber 48b, a diaphragm 48c, a valve spring 48d, a valve element 48e, and a valve seat 48f. The diaphragm 48c is disposed in the vacuum chamber 48a and the valve chamber 48b forms a part of the pressure passage 44. The valve element 48e and the valve seat 48f disposed in the valve chamber 48b, define the sectional area of the vacuum passage 44. Further, the valve element 48e is biased to the opening direction by the valve spring 48d through the diaphragm 48c. The vacuum chamber 48a is supplied with the vacuum Pe and the sectional area of the vacuum passage 44 is varied in response to the magnitude of the vacuum Pe. More specifically, it reduces as the vacuum Pe increases.

It will be understood, in the case of this variation, the sectional area of the vacuum passage through the air control valve 48 decreases as the load of the engine increases, since the magnitude of the vacuum Pe increases as the load of the engine increases. Further the sectional area of the vacuum passage 44, i.e., the total sectional area of the vacuum passage directed to the vacuum chamber 12a can be varied successively. Therefore, it becomes possible to control the air/fuel ratio to the leaner side from the stoichiometric value, as the engine load becomes lower, and to the richer side from the stoichiometric value as the engine load becomes high.

Figure 11:
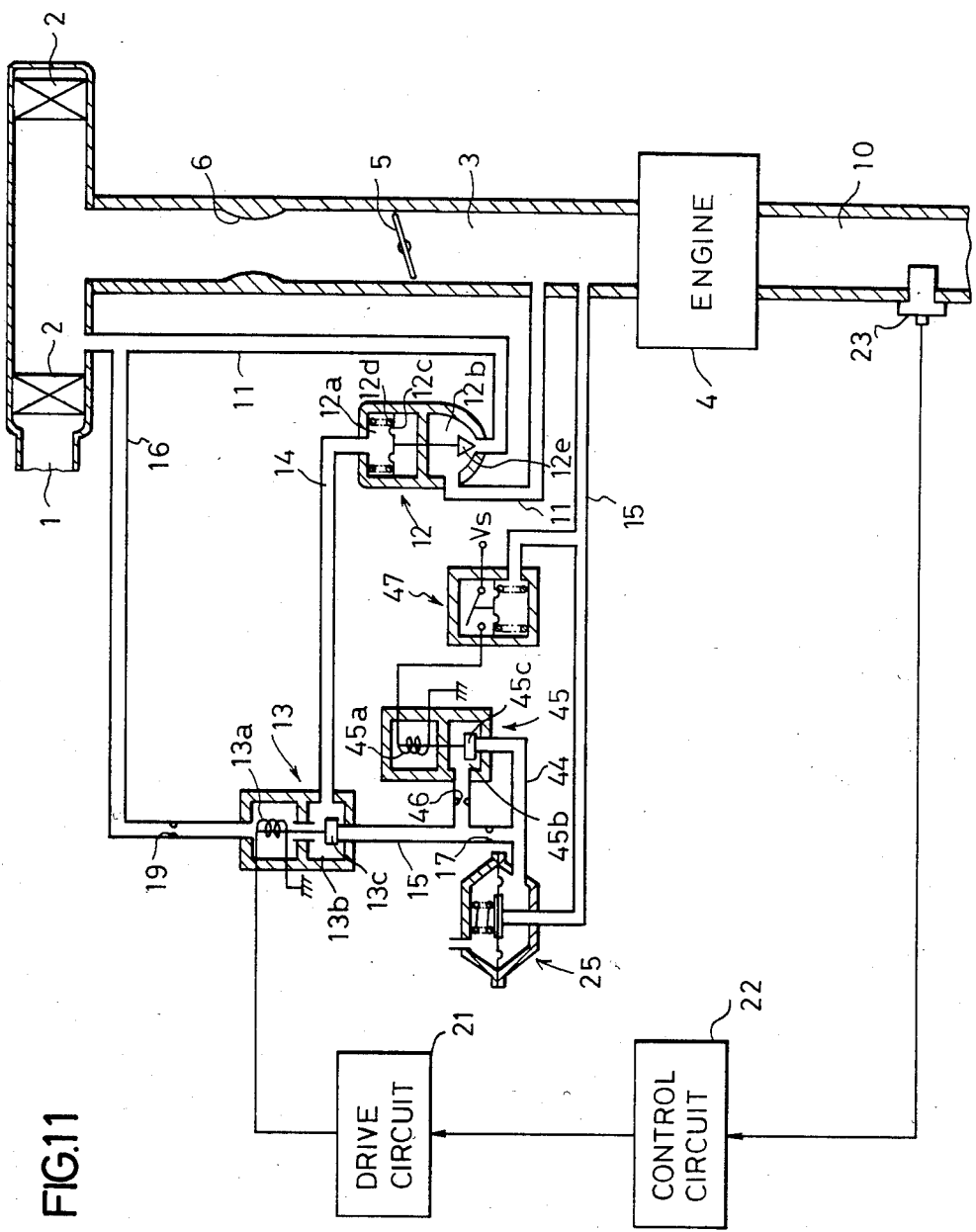
FIG. 11 is a schematic diagram showing another variation of the second embodiment shown in FIG. 8, in which the vacuum control part 31 is replaced by a constant vacuum control valve 25.

FIG. 11 shows another variation of the embodiment of FIG. 8, in which the vacuum passage 15 is communicated with the intake air passage 3, downstream of the throttle valve 5, and a constant vacuum control valve 25 is provided as the source of the first control pressure instead of the vacuum control part 31 of FIG. 8, and the constant vacuum control valve 25 is connected to the downstream side of the throttle valve, from the orifice 17. The constant vacuum control valve 25 is constructed to stabilize the vacuum downstream of the throttle valve to a vacuum Pr having a predetermined magnitude, when said vacuum is greater than the predetermined value. The other portions of this system are identical with those of the system of FIG. 8, and therefore, the explanation thereof is omitted.

It will be appreciated from the foregoing, in the case of this embodiment of the secondary air supply system according to the present invention, the supply of the secondary air, i.e., the air/fuel ratio control is performed in accordance with the pneumatic type integration operation, by supplying one of the first and second control pressures to the pressure chamber of the air control valve disposed in the secondary air passage. Futher, the sectional area of the pressure passage which solely supplies the first control pressure from the source of the first control pressure to the pressure chamber of the air control valve decreases as the load of the engine increases. Therefore, the speed of the opening of the air control valve, i.e., the speed of the air/fuel ratio control directed to the lean side, is varied by the use of the relatively simple construction. Accordingly, the total amount of the noxious component such as NOx, CO, and HC can be reduced if the sectional area of the pressure passage is selected to be greater during the light load operation of the engine in which the amount of CO and HC are large, than in the high load operation of the engine in which the amount of NOx is large, so that the air/fuel ratio is controlled to the lean side.

Figure 12:
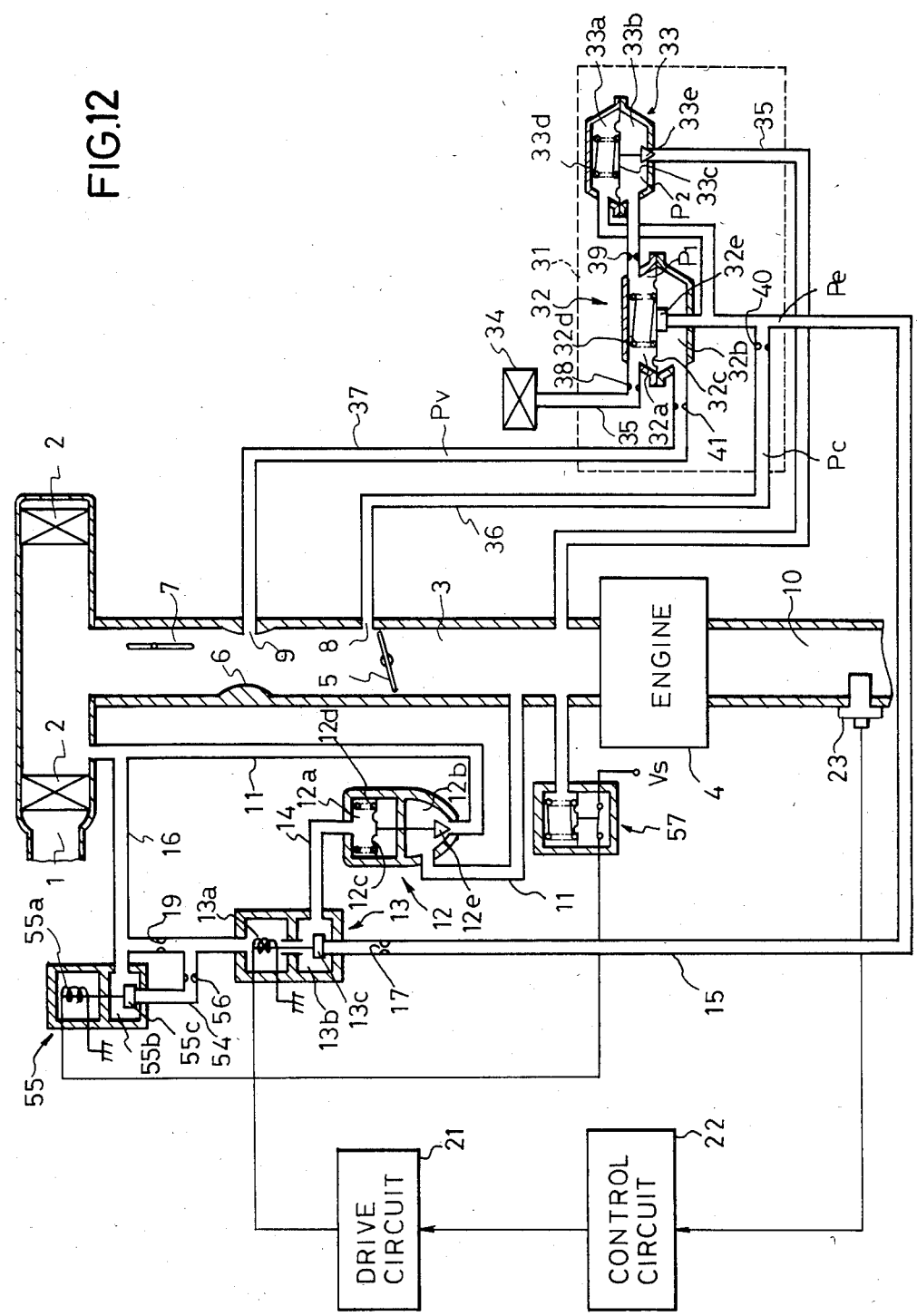
FIG. 12 is a schematic diagram showing a third embodiment of the air intake side secondary air supply system, provided with a device for varying the sectional area of the second pressure passage leading to the pressure chamber of the air control valve.

Turning to FIG. 12, the third embodiment of the present invention will be explained. This embodiment also has a construction basically the same as that of the first embodiment illustrated in FIG. 1

As shown, in addition to the construction of FIG. 1, a vacuum passage 54 is connected to the atmospheric pressure passage 16 so as to bypass the orifice 19. In the vacuum passage 54, there are further provided an electro-magnetic valve 55 and an orifice 56. The electro-magnetic valve 55 consists of a solenoid 55a, a valve chamber 55b which forms a part of the vacuum passage 54, and a valve element 55c disposed in the valve chamber 55b and magnetically coupled with the solenoid 55a. The operation of the electro-magnetic valve 55 is such that the communication through the vacuum passage 54 is established when the solenoid 55a is energized. For energizing the solenoid 55a a drive voltage Vs is supplied via a vacuum switch 57 which is connected to the intake air passage 3 and turns on when the vacuum downstream of the throttle valve 5 is smaller than a predetermined level.

The operation of the secondary air supply system of this embodiment, especially relating the operation of the electro-matgnetic valve 55 will be explained hereafter.

When the output signal of the control circuit 22 turns from the rich signal to the lean signal, the electro-magnetic valve 13 becomes inactivated to close the side of the vacuum passage 15, and to make the communication through the pressure passage 14 and the atmospheric pressure passage 16. By this operation, the vacuum chamber 12a is supplied with the atmospheric pressure through the orifice 19, and the vacuum in the vacuum chamber gradually approaches atmospheric pressure. Thus, the sectional area of the air intake side secondary air passage 11 gradually reduces to decrease the amount of the secondary air. In this state, if the vacuum downstream of the throttle valve 5 is below the predetermined value, then the vacuum switch 57 turns on to provide the voltage Vs to the solenoid 55a. As a result, the electro-magnetic valve 55 opens to make the communication through the vacuum passage 54. Thus, the atmospheric pressure is supplied to the vacuum chamber 12a through the orifice 56 as well as through the orifice 19. This means an increase in the total value of the sectional area of the atmospheric pressure passage. Therefore, the the speed of the drop of the vacuum in the vacuum chamber 12a is increased to raise the speed of closing of the air control valve 12.

When the pressure in the vacuum chamber 12a has become equal to the atmospheric pressure, the air control valve is closed to stop the communication through the secondary air passage, and as a result, the supply of the secondary air to the engine 4 is stopped.

Figure 13:
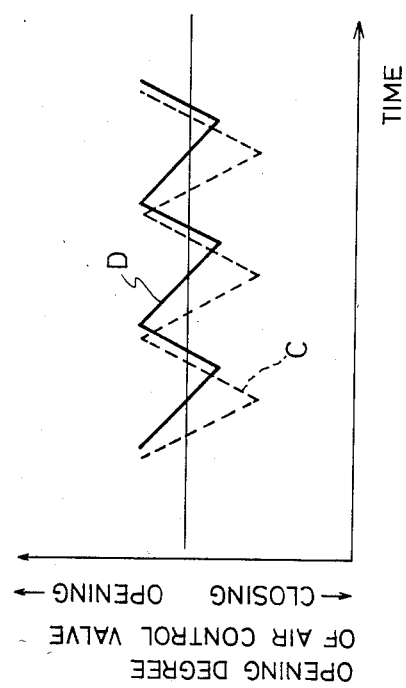
FIG. 13 is a diagram showing the operation of the air control valve of FIG. 12, during the light and medium load operation of the engine and during the high load operation of the engine.

It will be appreciated that in the case of this embodiment, the electro magnetic valve 55 is opened during high load operations of the engine, in which the magnitude of the vacuum downstream of the throttle valve is reduced below the predetermined value. By the opening of the electro-magnetic valve 55, the total value of the sectional area of the atmospheric pressure passage leading to the vacuum chamber 12a is increased. This means an increase in the value $S_2$ of the formula (2), resulting in an increase in the speed of the closing of the air control valve 12, that is, an increase in the speed of the air/fuel ratio control directed to the rich side during high load operations of the engine. The operation of the secondary air supply system in such a condition is best shown by the dashed line C of FIG. 13. In FIG. 13, there is also illustrated a solid line D, indicating the operation of the air control valve 12, i.e., the operation of the air/fuel ratio control system under the medium and the light load operations of the engine 4, in which the speed of the air/fuel ratio control directed to the rich side is slower than that in the high load operation of the engine. Accordingly, it will be understood, if the air/fuel ratio control during the light and medium load operations of the engine is aimed at the stoichiometric value or slightly lean side of the stoichiometric value, then the air/fuel ratio is controlled to the rich side of the stoichiometric value during high load operations of the engine.

Figure 14:
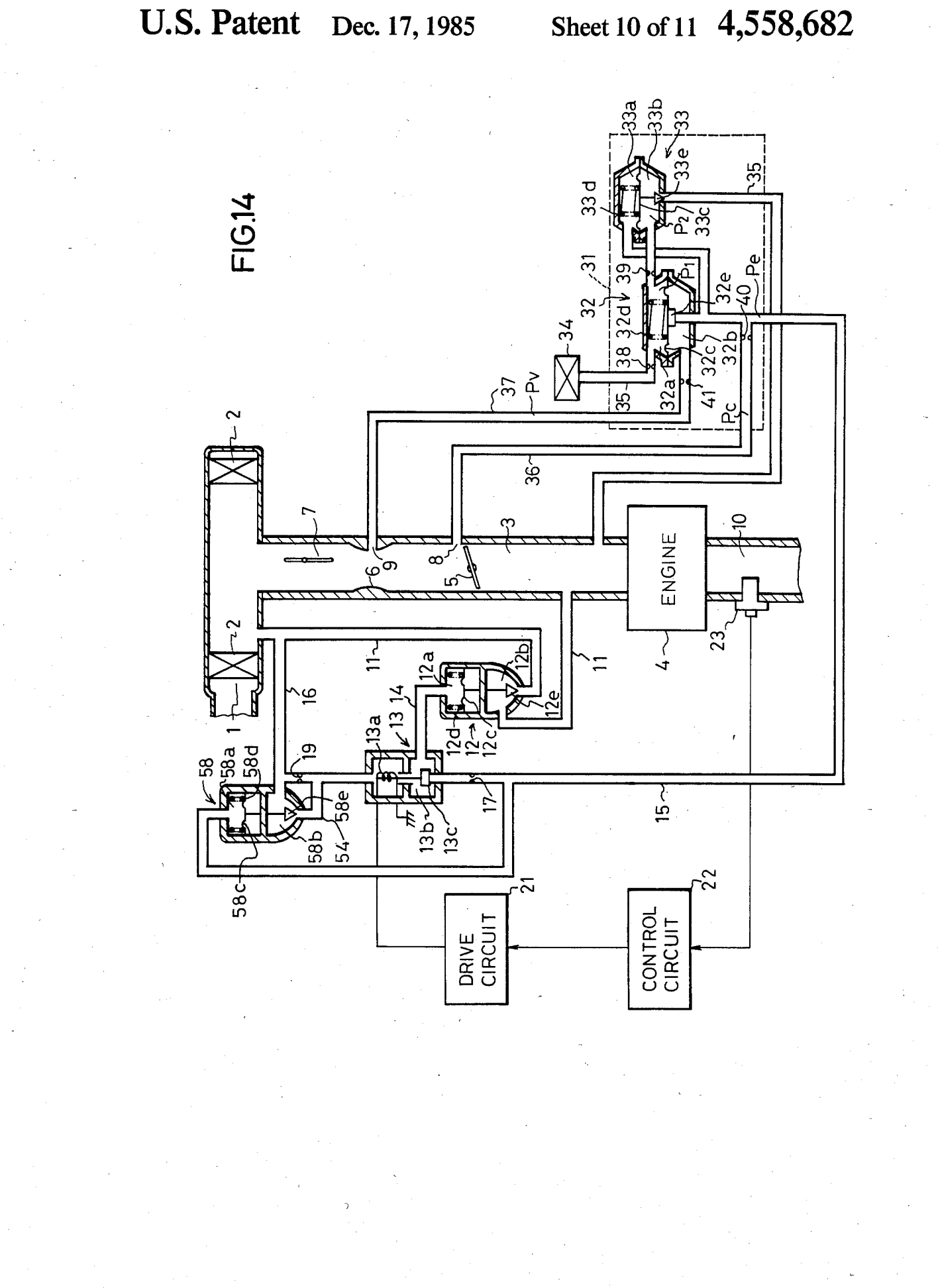

FIG. 14 shows a variation of the embodiment of FIG. 12, which is characterized by the provision of a vacuum control valve 58 provided in the vacuum passage 54 instead of the electro-magnetic valve 55. The vacuum control valve 58 is made in a similar manner as the air control valve 12, and consists of a vacuum chamber 58a, a valve chamber 58b, a diaphragm 58c, and a valve element 58e. The diaphragm 58c is disposed in the vacuum chamber 58a to which the vacuum Pe is supplied, and the valve chamber 58b forms a part of the atmospheric pressure passage 54. Therefore, the sectional area of the atmospheric pressure passage 54 varies with the magnitude of the vacuum Pe and specifically, the sectional area increases as the vacuum Pe increases.

It will be appreciated that in the case of this variation, since the magnitude of the vacuum Pe increases as the engine load increases, the sectional area of the atmospheric pressure passage 54 which is controlled by the vacuum control valve 58 increases as the engine load increases. Therefore, the sectional area of the atmospheric pressure passage 54 directed to the vacuum chamber 12a is continuously varied in accordance with the engine load. Thus, the air/fuel ratio control can be performed in such a manner that the air/fuel ratio is controlled to the lean side from the stoichiometric value as the engine load becomes lighter, and the air/fuel ratio is controlled to the richer side from the stoichiometric value as the engine load increases.

Figure 15:
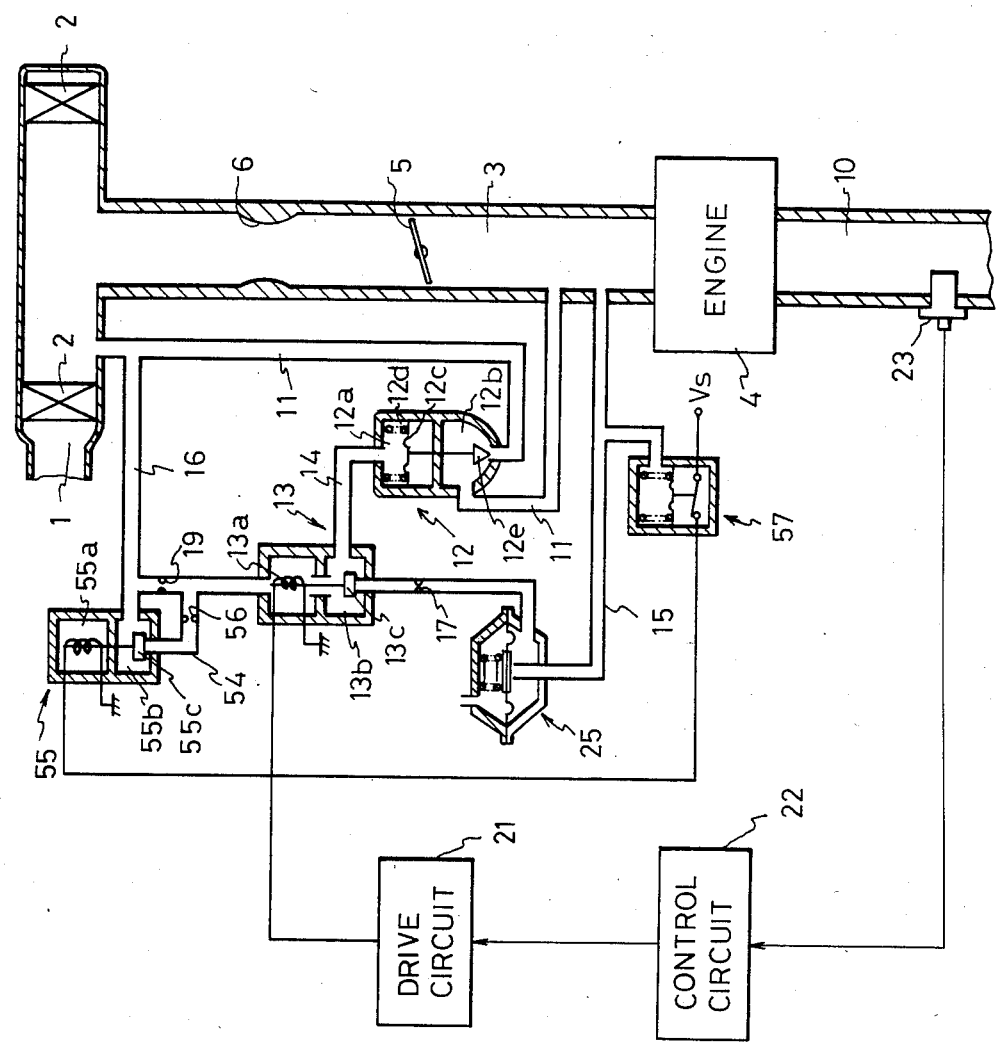
FIG. 15 is a schematic diagram showing another variation of the third embodiment shown in FIG. 12, in which the vacuum control part 31 is replaced by a constant vacuum control valve 25.

FIG. 15 illustrates another variation of the third embodiment of the present invention, in which the vacuum passage 15 is communicated to the intake air passage 3, downstream of the throttle valve 5, and a constant vacuum control valve 25 is provided in the downstream side of the throttle valve 5 from the orifice 17 instead of the vacuum control part 31 of FIG. 1.

The constant vacuum control valve 25 stabilizes the vacuum downstream of the throttle valve to a predetermined level when the former vacuum level is above the predetermined level.

It will be appreciated that this the case of the third embodiment, the air intake side secondary air supply system performs the supply of the air intake side secondary air, i.e., the air/fuel ratio control, by supplying one of the first and second control pressures to the pressure chamber of the air control valve, and the sectional area of the pressure passage for directing the second control pressure to the pressure chamber from the source of the second control pressure is varied according to the operational conditions of the engine. Thus, the speed of the air/fuel ratio control can be varied depending on the direction of the air/fuel ratio control, i.e., the control to the richer side or the control to the leaner side by using relatively simple construction.

Therefore, by designing the system in such a manner that the sectional area of the pressure passage is greater in high load operations of the engine in which the amount of NOx is large, than in light load operation of the engine in which the amount of HC and CO component is large, it becomes possible to adopt the air/fuel ratio control to the rich side. Therefore, the emission of the noxious components NOx, CO, and HC is supressed in total.

In addition, in the case of the above embodiment, there is an advantage that the control circuit for determining which of the first and second control pressures is to be applied to the pressure chamber of the air control valve, can be realized by a simple circuit construction which performs a comparison operation.

It will be understood that the foregoing description is for illustrative purpose only, and is not intended to limit the scope of the invention. Rather, there are numerous equivalents to the preferred embodiments, and such are intended to be covered by the appended claims. As an example, instead of detecting the engine vacuum as a parameter indicating the engine operation, by utilizing the vacuum downstream of the throttle valve, and an operating condition of the engine such as acceleration, idling can be determined by using such parameters as the intake air amount, opening angle of the throttle valve, engine speed, and vehicle speed or gear shift position, in the case of an engine to be mounted on a vehicle.

What is claimed is:

1. An air intake side secondary air supply system for an internal combustion engine, comprising:
   an air control valve disposed in a secondary air passage leading to an intake air passage downstream of a throttle value for controlling a sectional area of said secondary air passage in accordance with a pressure level of a pressure applied to a pressure chamber thereof;
   an air/fuel ratio detection means for detecting an air/fuel ratio from a composition of an exhaust gas of the engine, and generating an air/fuel ratio detection signal;
   a source of a first control pressure for producing a first control pressure for opening said air control valve;
   a source of a second control pressure for producing a second control pressure for closing said air control valve;
   a communication means responsive to said air/fuel ratio detection signal, for supplying one of said first and second control pressures respectively via a first pressure passage and a second pressure passage to said pressure chamber in accordance with said air/fuel ratio detection signal; and
   first and second orifices respectively provided in said first and second pressure passages for adjusting the speed of supply of said first and second control pressures,
   said source of first control pressure being operative to produce a vacuum pressure whose magnitude is proportional to the amount of an intake air of the engine, said source of first control pressure consisting of a first vacuum passage extending form said intake air passage in the proximity of the throttle valve, a second vacuum passage extending from inside of a venturi formed in said intake air passage upstream from said throttle valve, a control intake air passage leading from an air inlet port to a portion of the intake air passage downstream of said throttle valve, a vacuum responsive regulation valve having a first vacuum chamber disposed in the middle of said control intake air passage, a first valve chamber communicated with said second vacuum passage for making the communication between the first vacuum passage and the second vacuum passage through said first valve chamber in accordance with a pressure difference of the first valve chamber and the first vacuum chamber, and a vacuum responsive air valve having a second vacuum chamber communicated with said first vacuum passage, and a second valve chamber disposed in said control intake air passage downstream from said first vacuum chamber for providing a communication through said control intake air passage at an opening degree corresponding to a pressure difference between said second vacuum chamber and said second valve chamber, thereby providing a vacuum in the second vacuum chamber as said first control pressure.

2. An air intake side secondary air supply system for an internal combustion engine, comprising:
   an air control valve disposed in a secondary air passage leading to an intake air passage of the engine, downstream of a throttle valve;
   a detection means for detecting an air/fuel ratio from a composition of an exhaust gas of the engine, and generating an air/fuel ratio detection signal;
   a source of a first control pressure for opening said air control valve;
   a source of a second control pressure for closing said air control valve; and
   a communication means responsive to said air/fuel ratio detection signal for introducing one of said first and second control pressures into said pressure chamber in accordance with said air/fuel ratio detection signal, wherein said communication means includes a varying means for varying a sectional area of one of the presssure passages respectively for the first and second control pressures, according to operational conditions of the engine, said source of first control pressure consisting of a first vacuum passage extending from said intake air passage in the proximity of the throttle valve, a second vacuum passage extending from inside of a venturi formed in said intake air passage upstream from said throttle valve, a control intake air passage leading from an air inlet port to a portion of the intake air passage downstream of said throttle valve, a vacuum responsive regulation valve having a first vacuum chamber disposed in the middle of said control intake air passage, a first valve chamber communicated with said second vacuum passage for making the communication between the first vacuum passage and the second vacuum passage through said first valve chamber in accordance with a pressure difference of the first valve chamber and the first vacuum chamber, and a vacuum responsive air valve having a second vacuum chamber communicated with said first vacuum passage, and a second valve chamber disposed in said control intake air passage downstream from said first vacuum chamber for providing a communication through said control intake air passage at an opening degree corresponding to a pressure difference between said second vacuum chamber and said second valve chamber, thereby providing a vacuum in the second vacuum chamber as said first control pressure.

3. An air intake side secondary air supply system for an internal combustion engine, comprising:
an air control valve disposed in a secondary air passage leading to an intake air passage of the engine, downstream of a throttle valve;
a detection means for detecting an air/fuel ratio from a composition of an exhaust gas of the engine, and generating an air/fuel ratio detection signal;
a source of a first control pressure for opening said air contol valve;
a source of a second control pressure for closing said air control valve; and
a communication means responsive to said air/fuel ratio detection signal for introducing one of said first and second control pressures into said pressure chamber in accordance with said air/fuel ratio detection signal, said communication means includes a varying means for varying a sectional area of one of the pressure passages respectively for the first and second control pressures according to operational conditions of the engine, said communication means including a first pressure passage for directing said first control pressure to the pressure chamber of the air control valve and a second pressure passage for directing said second control pressure to the pressure chamber of the air control valve, said varying means being provided to said first pressure passage, the sectional area of the first pressure passage being designed to become larger during light load operations of the engine than at high load operations of the engine, and said varying means consisting of a bypass passage connected to said first pressure passage, and vacuum responsive valve having a vacuum chamber to which the first control pressure is applied for controlling a communication through said bypass passage in accordance with a magnitude of said first control pressure.

4. An air intake side secondary air supply system for an internal combustion engine, comprising:
an air control valve disposed in a secondary air passage leading to an intake air passage of the engine, downstream of a throttle valve;
a detection means for detecting an air/fuel ratio from a composition of an exhaust gas of the engine, and generating an air/fuel ratio detection signal;
a source of a first control pressure for opening said air control valve;
a source of a second control pressure for closing said air control valve; and
a communication means responsive to said air/fuel ratio detection signal for introducing one of said first and second control pressures into a vacuum chamber of said air control valve in accordance with said air/fuel ratio detection signal, wherein said communication means includes first and second pressure supply passages for said first and second control pressures respectively, a control valve for supplying one of said first and second control pressures into said vacuum chamber of said air control valve, according to an air/fuel ratio detection signal, first and second orifices respectively provided in said first and second pressure supply passages, and a bypass control valve disposed in a bypass passage which bypasses one of said first and second orifices, for opening and closing said bypass passage according to operational conditions of the engine.

5. An air intake side secondary air supply system as set forth in claim 4, wherein said source of first control pressure consists of a source of a constant vacuum.

6. An air intake side secondary air supply system as set forth in claim 4, wherein said operational conditions of the engine are detected from at least one of the vacuum downstream of said throttle valve, intake air amount, opening angle of the throttle valve, engine speed, speed of vehicle, and gear shift position.

7. An air intake side secondary air supply system as set forth in claim 4, wherein said communication means includes a first pressure passage for directing said first control pressure to the pressure chamber of the air control valve and a second pressure passage for directing said second control pressure to the pressure chamber of the air control valve, and said varying means is provided to said first pressure passage.

8. An air intake side secondary air supply system as set forth in claim 7, wherein the sectional area of the first pressure passage is designed to become larger during light load operations of the engine than that of high load operations of the engine.

9. An air intake side secondary air supply system as set forth in claim 8, wherein said varying means consists of a bypass passage connected to said first pressure passage, an electro-magnetic valve for controlling a communication through said bypass passage, and a vaccum responsive switch for supplying a drive voltage to said electro-magnetic valve in accordance with a magnitude of vacuum in the intake air passage, downstream of the throttle valve, so that said electro-magnetic valve is opened when the magnitude of the vacuum is greater than a predetermined value.

10. An air intake side secondary air supply system as set forth in claim 4, wherein said communication means includes a first pressure passage for directing said first control pressure to the pressure chamber of the air control valve and a second pressure passage for directing said second control pressure to the pressure chamber of the air control valve, and said varying means is provided to said second pressure passage.

11. An air intake side secondary air supply system as set forth in claim 10, wherein the sectional area of the second pressure passage is designed to become larger during high load operations of the engine than that of light load operations of the engine.

12. An air intake side secondary air supply system as set forth in claim 11, wherein said varying means consists of a bypass passage connected to said second pressure passage, an electro-magnetic valve for controlling a communication through said bypass passage, and a vacuum responsive switch for supplying a drive voltage to said electro-magnetic valve in accordance with a magnitude of vacuum in the intake air passage, downstream of the throttle valve, so that said electro-magnetic valve is opened when the magnitude of the vacuum is lower than a predetermined value.

13. An air intake side secondary air supply system as set forth in claim 11, wherein said varying means consists of a bypass passage connected to said first pressure passage, and a vacuum responsive valve having a vacuum chamber to which the first control pressure is applied, for controlling a communication through said bypass passage in accordance with a magnitude of said first control pressure.

* * * * *